United States Patent [19]

Martin et al.

[11] 4,160,652

[45] Jul. 10, 1979

[54] METHOD AND APPARATUS FOR HANDLING THE FLUIDS IN A TWO-PHASE FLOW PIPELINE SYSTEM

[75] Inventors: Robert E. Martin, Spring; Ernest P. Hagan, Jr., Houston, both of Tex.

[73] Assignee: Texas Eastern Engineering, Ltd., Houston, Tex.

[21] Appl. No.: 828,191

[22] Filed: Aug. 26, 1977

[51] Int. Cl.[2] .................... B01D 19/00

[52] U.S. Cl. .................... 55/46; 55/170; 55/185; 55/219

[58] Field of Search .................... 15/104.06 A; 55/46, 55/164, 170, 185, 192, 219, 385 R, 385 C; 137/177, 187, 204, 268

[56] References Cited

U.S. PATENT DOCUMENTS

| | | | |
|---|---|---|---|
| 2,605,716 | 8/1952 | Huber | 137/204 X |
| 3,070,935 | 1/1963 | DeLeon | 55/170 |
| 3,318,074 | 5/1967 | Keller, Sr. | 55/219 X |
| 3,486,297 | 12/1969 | Eisinga et al. | 55/46 X |
| 3,561,193 | 2/1971 | Baranowski | 55/46 |
| 3,630,002 | 12/1971 | Burrus | 55/164 |
| 3,664,356 | 5/1972 | Grove et al. | 137/268 X |
| 3,722,530 | 3/1973 | Van Arscale et al. | 137/268 |
| 3,765,442 | 10/1973 | Nettles et al. | 55/46 X |

*Primary Examiner*—Robert H. Spitzer

*Attorney, Agent, or Firm*—Vinson & Elkins

[57] ABSTRACT

A method and apparatus for handling the fluids in a two-phase flow pipeline system. The gas-liquid flow stream is fed into a separator in which the gas is separated from the liquid. The gas is removed upwardly from the seapaprator through a control valve. The liquid is removed downwardly from the lower portion of the separator. The liquid level in the separator is detected and a controller effects opening or closing of the control valve whereby the rate of flow of the liquid out of the separator is controlled. An elongated accumulator is in fluid communication with both the liquid outlet of the separator and the outlet of the control valve. The liquid flowing out of the separator is fed into the elongated accumulator loop which has previously been filled with gas. A free piston is positioned in the accumulator loop ahead of the liquid to separate the accumulated liquid from the gas in the accumulator loop. When a quantity of liquid has been transferred to the accumulator loop, selected valving is operated to supply pressure from a pressurized gas source, such as, the discharge pipeline of a gas compressor station, to the gas side of the free piston in the accumulator loop to drive the accumulated liquid back out of the accumulator loop and into a pipeline system, such as, the discharge pipeline of the compressor station.

14 Claims, 1 Drawing Figure

METHOD AND APPARATUS FOR HANDLING THE FLUIDS IN A TWO-PHASE FLOW PIPELINE SYSTEM

BACKGROUND AND OBJECTS OF THE INVENTION

This invention relates to methods and apparatus for handling fluids in a two-phase flow, pipeline system, such as, gas and liquid, or two immissible liquids of different specific gravities. This invention particularly relates to a method and apparatus for transferring liquids from the suction side of a gas compressor station to the discharge side of such station whereby the liquid does not enter or impair the operation of the compressors in the gas compressor station. However, this invention is also useful as a method and apparatus for withdrawing liquids from a two-phase flow pipeline not having a compressor station at the point of withdrawal, for storing the liquids, and for reinserting the liquids at a suitable later time back into the same pipeline or into another pipeline of suitable character.

The accumulation of liquid hydrocarbons in natural gas pipelines connected to flowing production wells creates problems if the accumulated liquid reaches the compressors in a gas compressor station installed in such pipeline. When a large diameter pipeline system is purposely utilized to transport large quantities of liquids intermingled with gas and the pipeline is adapted to utilize a movable sphere for urging the liquids along the pipeline, it is not uncommon for a three or four thousand barrel slug of liquid to arrive at a gas compressor station, thus presenting a difficult problem of transferring the liquid out of and back into the system to avoid the gas compressors. When the two-phase fluids are transported at high pressures and velocities, the problem of handling the liquid at a gas compressor station becomes even more difficult.

Historically, removal of accumulated liquid from a two-phase flow pipeline system at a gas compressor station has been accomplished through the use of separators, storage tanks, and pumps for inserting the liquid back into the pipeline system on the discharge side of the gas compressor station. This traditional prior art manner of handling liquids at a gas compressor station has been the practice for gas compressor stations built on land because large storage tanks can be constructed adjacent the compressor station. This traditional manner of handling liquids at a gas compressor station has on occasion also been used for offshore and onshore pipeline systems which do not employ a sphere or "pig" for accumulating and transferring the liquid, as the separators in such systems can handle relatively small quantities of liquid arriving at the station. But the traditional methods are disadvantageous when large slugs of liquid arrive at the station in a spontaneous manner. The prior art systems are particularly disadvantageous when the compressor station is located on a platform in offshore waters where it is difficult and costly to construct large storage tanks at the compressor station or when the two-phase pipeline transmission system utilizes spheres or "pigs" for periodically accumulating and sweeping the liquids along the pipelines whereby large slugs of liquid are regularly brought to the gas compressor station.

It is an object of this invention to provide an improved method and apparatus for transferring liquids being transported in a two-phase flow pipeline system from the suction side to the discharge side of a gas compressor station in such system, which method and apparatus is particularly adaptable for use in offshore environments.

It is a further object of this invention to provide a method and apparatus for transferring selected quantities of liquid flowing in a two-phase flow pipeline system from the suction side to the discharge side of a gas compressor station in such system and which method and apparatus may be utilized to transfer large volumes of liquid being transported at high pressures and velocities.

It is still a further object of this invention to provide a method and apparatus for separating large quantities of liquids flowing at high pressures and velocities in a two-phase flow pipeline whereby such liquids can be removed from the pipeline system at line flow velocities and whereby such liquids can be reinserted into the pipeline system at selected velocities up to line flow velocities.

It is an object of this invention to provide an improved method and apparatus for transferring at line velocities selected quantities of liquid flowing in a two-phase flow pipeline system from the suction side to the discharge side of a gas compressor station in such system without the use of special pumps or atmospheric or high pressure storage tanks.

In the method and apparatus according to this invention, as applied to a liquid/gas pipeline system at a point where there is a gas compressor station, a slug of liquid or accumulated liquid arriving at the gas compessor station is directed into a separator means on the suction side of the compressor station. Any incoming gas which is mixed with the liquid or is transported ahead of the liquid is bled off the separator upwardly through a control valve and is thereafter compressed by the compressor station in the normal manner. The liquid is removed from the lower portion of the separator. The liquid level in the separator is detected and a controller effects opening or closing of the control value to control the differential pressure across the accumulated liquid whereby the rate of flow of the liquid out of the separator is controlled. The liquid flowing out of the separator is fed into an elongated accumulator loop which, in the case of use in an offshore environment, may be constructed on the sea bed. Preferably the elongated accumulator loop has previously been filled with gas. A sphere is positioned into the accumulator loop to separate the liquid from the gas downstream in the accumulator loop. As the liquid moves into the accumulator loop, the gas stored in the accumulator loop is forced out, combined with any gas bled off the separator through the control valve, and fed to the compressor in the gas compressor station to provide such compressor with a continuous source of gas to be compressed. When a selected quantity of liquid has been transferred into the accumulator loop, selected valving is operated to supply pressure from the discharge side of the gas compressor station into the accumulator loop to drive the liquid out of the accumulator loop and into the pipeline on the discharge side of the compressor station.

DESCRIPTION OF THE PREFERRED EMBODIMENT

Figure 1:
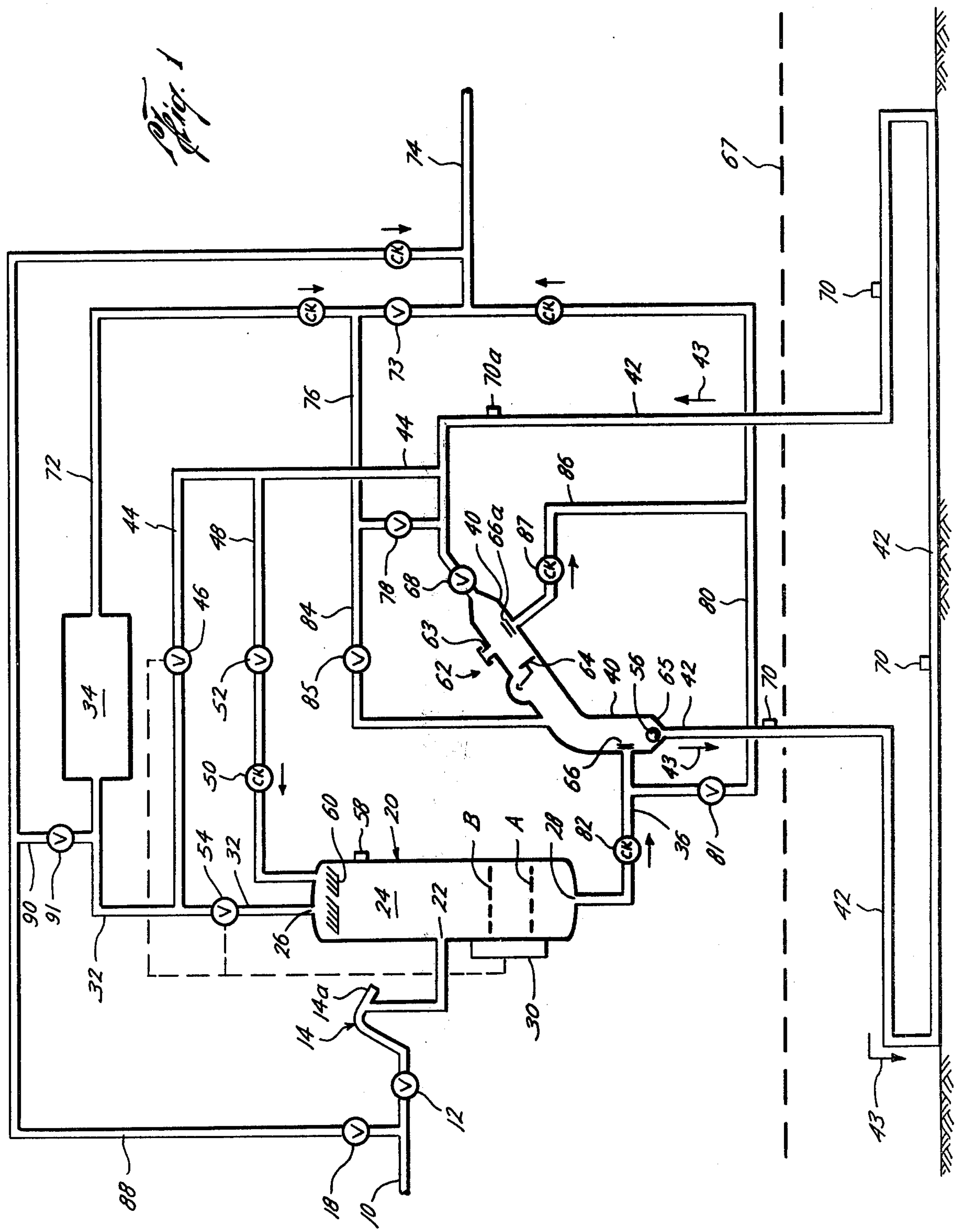
FIG. 1 is a schematic illustration of the system according to his invention.

FIG. 1 illustrates schematically the preferred embodiment of the method and apparatus according to this invention for transferring liquids in a two-phase flow pipeline system from the suction side to the discharge side of a gas compressor station installed in the system. The liquid-gas two-phase flow arrives at the compression station in the incoming pipeline 10. The incoming pipeline 10 is connected through a valve 12 to a pipeline sphere receiver means 14. The sphere receiver means 14 includes a sphere receiving barrel 14*a*. The pipeline sphere receiver means 14 functions to receive any sphere which is being utilized in the system to propel a slug of liquid through the pipeline 10. The flow outlet of the pipeline sphere receiver means 14 is coupled into a gas-liquid separator 20 through its inlet nozzle 22. Thus, when valve 12 is open and bypass valve 18, which will be described hereinafter, is closed, the entire flow stream of the main pipeline 10, both liquid and gas, enters the separator 20 at the inlet nozzle 22 of the separator.

In the preferred embodiment of the separator according to this invention, the separator 20 comprises a plenum chamber 24 having one inlet nozzle 22 and a first outlet nozzle 26 and a second outlet nozzle 28. Preferably, the separator is physically oriented vertically whereby the first outlet nozzle 26 is disposed higher in elevation than the inlet nozzle 22 and the second outlet nozzle 28 is physically located below the inlet nozzle 22. The plenum chamber 24 preferably includes a liquid level controller means 30 mounted therein which senses any gas-liquid interface surface within a selected segment of the plenum chamber. Preferably the volume and geometry of the plenum chamber 24 is large enough to receive the incoming two-phase flow at line velocities and separate the liquids from the gas whereby the liquid can flow downwardly out of the separator through the second outlet nozzle and the gas can be withdrawn from the separator upwardly through the first outlet nozzle.

The first outlet nozzle 26 located at the top of the separator is connected through suitable piping 32 to the gas compressors 34 whereby the gas withdrawn from the separator is supplied to the compressors. The second nozzle 28 at the lower end of the separator 20 is connected through suitable piping 36 to chamber 40 which is the upstream end of and constitutes part of an elongated accumulator loop 42. In the illustration of the system depicted in FIG. 1, the arrows 43 point along the downstream direction of the elongated accumulator loop. The elongated accumulator loop 42, as will hereafter be described in more detal, functions to receive and store temporarily the liquid separated from the two-phase flow by the separator. At a selected point in the accumulator loop, preferably near the farthest point downstream from the junction of the interconnecting piping 36 and the accumulator loop, additional suitable piping 44 provides a fluid communication path between the accumulator loop 42 and the piping 32 leading to the input of the gas compressors 34. A quick acting control valve 46 is connected into the piping 44 to regulate when gas may flow from the accumulator loop 42 through the piping 44 and into the gas compressors 34. Preferably, additional equalizing piping 48 having check valve 50 and control valve 52 therein connects between piping 44 and the separator 20 to equalize the gas pressure downstream of any sphere located in accumulator loop 42 with the gas pressure in the separator whenever the control valve 46 is closed. A quick acting throttling control valve 54 is connected into the piping 32 between the first outlet nozzle 26 and the point at which the piping 44 connects with the piping 32.

The throttling control valve 54 and the control valve 46 are operated by the liquid level controller means 30 associated with the separator. The liquid level controller means 30 may be any of numerous commercially available apparatus well known to those skilled in the art which functions to open and close the control valves 46 and 54 as hereinafter described responsive to the level of the separated liquid in the separator 20.

Under normal conditions the liquid level in the separator is below a minimum preselected level A. As such, throttling control valve 54 is normally open and control valve 46 is normally closed. As liquid is separated from the gas in the separator, the liquids flow by force of gravity downwardly through the piping 36 and into accumulator loop 42 behind a moveable free piston, such as a sphere 56, positioned therein by sphere launcher/receiver means connected into the chamber 40, which sphere launcher/receiver means will be described hereinafter. The hydraulic head of the liquids accumulated above and behind the sphere, that is, accumulated behind the sphere in the upstream portion of the elongated accumulator loop, in the piping 36 and in the separator 20, tends to force the sphere downstream along the accumulator loop. As will be described in more detail hereinafter, in the method and apparatus according to this invention, prior to liquid being supplied into the separator 20 and then into the accumulator loop 42, the elongated accumulator loop preferably is filled with gas.

Check valve 50 in line 48 opens as necessary to allow such gas in the accumulator loop 42 downstream of the sphere to be released into the separator and thereby minimize the back pressure on the sphere. Control valve 46 is closed to prevent any migration of the sphere 56 which could be induced by a pressure drop across the open control valve 54 and the piping 32 between the separator and the downstream junction of piping 32 with piping 44. In this way, liquids at low influx rates can be separated and accumulated by the method and apparatus according to this invention without any throtting action of control valve 54.

Whenever conditions are such that the liquid level in the separator rises above minimum set level A, liquid level controller means 30 cause control valve 46 to open and throttling control valve 54 to operate in a throttling mode to create a pressure differential across the liquid level in the separator 24 and the downstream side of the sphere 56 in the accumulator loop 42. This pressure differential, supplementing the hydraulic head of the accumulated liquids above the sphere, forces the accumulating liquids to flow downwardly from the separator into the accumulator loop 42 and thereby moves the sphere 56 along the loop. As it moves downstream in the accumulator loop, the sphere 56 displaces the gas in the accumulator loop through the open control valve 46 to the suction side of the compressors 34. Check vale 50 closes whenever the differential pressure created by the throttling control valve 54 causes the gas pressure in the separator 20 to exceed the gas pressure in the downstream portion of the accumulator loop 42 and the piping 44.

Thus, the control valve 46 is normally closed, but the liquid level controller means 30 generates the necessary control signals to fully open the control valve 46 whenever the liquid level in the plenum chamber rises above a preselected minimum set level A. The throttling control valve 54 is normally open, but the liquid level controller 30 generates the necessary control signals to commence closing control valve 54 whenever the liquid level in the plenum chamber rises to the preselected minimum set level A and to continue closing the control valve 54 proportionately as the separated liquids collect in the plenum chamber and the liquid level rises toward set level B whereby when the liquid level reaches the preselected maximum set level B control valve 54 is fully closed.

The action of the liquid level controller means 30 and the throttling closure of the control valve 54 and the opening of the control valve 46 preferably are sufficiently fast that liquids accumulating in the plenum chamber 24 are prevented from rising above the maximum preselected level B and from exiting through the top outlet nozzle 26. In addition, the volume of the plenum chamber preferably is sufficiently large in capacity above the maximum set level to provide time for the throttling control valve 54 to close and thereby prevent the liquids from leaving the plenum chamber through the first outlet nozzle 26 even if a full-pipe continuous slug of liquid driven by a sphere in the two-phase flow pipeline 10 at full pipeline velocity is propelled in the plenum chamber.

In practice, an emergency float switch 58 may be incorporated into the separator 20 at a reserve liquid level to generate a signal for shutting down the gas compressors in the compressor station or for initiating other emergency measures pertaining to the operation of the compressor station in the event the liquid level controller means 30 fails to operate or the throttling control valve 54 fails to close properly. In addition, a mist extractor or demister device 60 may be installed in the upper portion of the plenum chamber to remove entrained mist liquids from the outlet gas to further reduce the liquid-gas ratio of the outlet gas from the separator to a practical minimum and to conduct the liquids so coalesced to the bottom of the separator.

The elongated accumulator loop 42 preferably includes a sphere launcher/receiver means 62 which functions to insert one or more free pistons or spheres 56 into the accumulator loop ahead of or behind the liquids being transferred from the separator into the accumulator loop. The sphere launcher/receiver means 62 preferably includes means 63 for inserting a sphere into the chamber 40 or removing spheres from the chamber 40, and valve mechanism 64 for selectively preventing the flow of a returning sphere through the chamber 40. The sphere launcher/receiver means 62 may be fabricated by one conversant with the pipeline art from commercially available components such as a Uni-Launch Valve, Model 100-W, manufactured by the Wheatly Company, Inc. of Tulsa, Oklahoma, a Huber-Yale Figure 500 Closure manufactured by J. M. Huber Corp., Yale Machine Dept. of Houston, Texas, a suitable pipe tee and associated piping. The sphere launcher/receiver means 62 preferably is connected to the upper end of the enlarged chamber 40 which is formed in and is part of the accumulator loop 42. The connection of the sphere launcher/receiver means with the enlarged chamber preferably is at a point physically above the point at which the interconnecting piping 36 connects to the elongated accumulator loop 42. The chamber 40 preferably is larger in diameter than the sphere to be inserted therein whereby an injected sphere moves through the chamber 40 by gravity to a reducer 65 which connects between the chamber and the main body of the elongated accumulator loop 42. A barred tee connection 66 preferably is utilized to connect the piping 36 to the chamber 40 whereby the spheres are prevented from moving from the chamber back into the pipine 36.

When the method and apparatus according to this invention is utilized in connection with offshore installations, the elongated accumulator loop 42 preferably is positioned downwardly into the sea 67 with the bulk of the elongated accumulator loop 42 laid on the sea bed. In this way, a large length of accumulator loop 42 and a correspondingly large accumulator storage volume can be utilized without taking up space on the offshore platform. The preferred form of the accumulator loop 42 to function as a sea bed liquid storage device is a pipeline of sufficient diameter, length and strength to provide the desired liquid storage capacity at the desired operating pressure. As an example, a system according to this invention might employ a mile or more of large diameter pipe, such as 36" or 48" diameter, laid on the sea bed by conventional or other offshore pipe laying methods and looping outward from the platform and back to the platform in any of a number of configurations. The accumulator loop need not be laid in a single horizontal plane nor need it be laid to grade or in a plane of continuous selected slope. Rather it may be conventionally laid as the conditions of the sea bed require with respect to elevation and with respect to ecology or other regulatory requirements of authorities having jurisdiction over such pipeline. The accumulator loop 42 has the benefit that it eliminates large structural loading requirements associated with conventional storage systems located on a platform. It also eliminates the need for large spacial requirements on the platform which are associated with storage tanks. Both of these benefits result in favorable capital costs and economics for offshore gathering systems requiring storage for fluid transfer systems. Economic advantages exist whenever the cost of laying the required length of elongated loop on the sea bed is less than the cost of fabricating and installing separate multiple large diameter high-pressure storage vessels on the platform. In onshore installations, the preferred form of the accumulator loop can be a pipeline laid underground and therefore no fire wall or dike need be constructed as is often required for above-ground atmospheric or low pressure storage tanks of volatile hydrocarbons.

The preferred embodiment of the free piston to be used in the accumulator loop is, as mentioned above, a sphere 56, though other forms of free pistons may be utilized, such a multiple rubber scraper or polyurethane flexible pigs, both of which are well-known in the pipeline art. The fit of the sphere to the inside of the accumulator loop should be smooth and tight thereby establishing a seal so that the sphere moves as requried but without allowing fluids on one side of it to flow past to the other side of it. Such a sphere may be constructed of polyurethane and be hollow and filled through a check valve stem with a selected fluid such as water, glycol solution or oil, to increase its diameter to a size slightly larger than the inside diameter of the accumulator loop. When the sphere is introduced into the accumulator loop 42, its circumference compresses and flattens at the pipe surfaces and in so doing both increases its friction to movement within the accumulator loop and increases the tightness of the seal between the sphere and the accumulator loop.

As stated above and as illustrated in FIG. 1, the accumulator loop 42 preferably forms a continuous loop. The downstream end of the accumulator loop is connected back through valve 68 into the enlarged chamber 40 above the sphere launcher/receiver means 62. Valve 68 is open whenever liquids are being accumulated in the elongated accumulator 42. Secured in the elongated accumulator loop 42 at selected positions are a plurality of position sensors 70, well known to the pipeline art, which detect the movement of the sphere as it passes selected locations in the elongated accumulator loop. The signals generated by the position sensors 70 provide information concerning the quantity of liquid which has moved into the accumulator loop 42 and can be useful to determine when accumulated liquids should be transferred to the gas compressor station discharge piping.

The discharge from the gas compressors 34 is coupled through suitable piping 72 having control valve 73 therein to the main discharge pipeline 74 on the discharge side of the compression station. An accumulator pressurizing line 76 connects between the gas compressor discharge line 72 and the downstream end of the accumulator loop 42 through valve 78.

A liquid discharge line 80 with control valve 81 therein is connected between the interconnecting piping 36 leading to the accumulator loop 42 and the main discharge pipeline 74. The liquid discharge line 80 is preferably connected into piping 36 downstream of a check valve 82 connected in the piping 36. The system also preferably includes bypass piping 84 with control valve 85 therein connected between the accumulator pressurizing line 76 and the chamber 40 beneath the sphere launcher/receiver means 62.

Under conditions when liquids are being accumulated in the accumulator loop 42, valves 78 and 85 are closed, and the pressurized gas discharged by the gas compressors 34 is transported by the piping 72 through an appropriate check valve and through control valve 73 into the main discharge pipeline 74. When accumulated liquids are to be transferred from the accumulator loop 42 to the main discharge pipeline 74, preferably valve 68 at the downstream end of the accumulator loop 42 is closed, valve 52 is closed, the signals from liquid level controller means 30 to control valve 46 are overridden or nullified whereby control valve 46 is closed, valve 81 is opened, and then pressurizing valve 78 is opened thereby supplying discharge pressure to the downstream side of the moveable sphere 56. By partially closing valve 73 a differential pressure is created across the liquid and the sphere in the accumulator loop 42 and the liquids in the accumulator loop are driven by the sphere from the loop 42 through open valve 81 through liquid discharge line 80 into the main discharge pipeline 74. The rate of flow of the liquids from the accumulator loop 42 to the main pipeline is controlled by the amount of closure of control valve 73. A conventional sphere launcher, if installed in the main pipeline 74, can be used to launch a sphere into the main pipeline 74 at an appropriate time to propel the transferred liquids down that pipeline.

It is preferable for there to be piping 86 with a check valve 87 connected therein connected between the upper portion of enlarged chamber 40 and the liquid discharge line 80 at a point downstream of valve 81. A barrel tee **66*a* is utilized in the upper portion of the enlarged chamber 40 to prevent the sphere from entering or stopping-up the piping 86. As previously described, piping 84, with valve 85 connected therein, preferably is connected between compressor station discharge piping 72 and the enlarged chamber 40. These two connections function to enable a sphere 56 placed into the elongated accumulator loop to be removed therefrom. These two connections also allow the liquids accumulated in the elongated accumulator loop to be forced out through a different application of pressurized gas. In this application, when it is desired to transfer accumulated fluids from the elongated accumulator loop 42 to the discharge piping 74, a second sphere (not shown) is inserted into the accumulator loop through the sphere launcher/receiver means 62 and the second sphere moves by gravity to the reducer 65. With control valves 46, 52, 78 and 81 closed, valve 85 is opened thereby supplying discharge pressure to the upstream side of the second moveable sphere. By partially closing valve 73 a differential pressure is created across the liquids, sphere 56, and the second sphere (not shown) in the accumulator loop whereby sphere 56 is driven downstream in the accumulator loop through open valve 68. The valve mechanism 64 of the launcher/receiver means 62 being locked closed, the gas downstream of sphere 56 is discharged through open valve 68, through check valve 87 and through piping 86 and piping 80 into main line piping 74 until such time as sphere 56 emerges into the upper end of oversized chamber 40 of the sphere launcher/receiver means 62 from which it can subsequently be removed. The liquids downstream of the second sphere continue to be driven through the accumulator loop 42, through open valve 68, and thence through check valve 87 and piping 86 and piping 80 into the main line piping 74 until such time as the second sphere emerges through valve 68 into the upper end of enlarged chamber 40 of the sphere launcher/receiver means 62** from which it also can be subsequently removed.

It can be seen that in the method and apparatus according to this invention liquids accumulated in accumulator loop 42 may be transferred to main discharge pipeline 74, depending on which particular valves are manipulated and the manner of use of spheres, either through valve 81 and liquid discharge line 80 or through check valve 87 and liquid discharge line 80. The former is a bi-directional use of the accumulator loop and the latter is a unidirectional use of the accumulator loop.

Normally at a gas compressor station, a by-pass line 88 connects between the incoming pipline 10 and the discharge pipeline 74 whereby the entire separating and compressing system can be bypassed by the flow stream if desired. The bypass line 88 may be connected through piping 90 and control valve 91 into the piping 32 leading into the intake for the gas compressors 34 whereby the gas flow from the first outlet nozzle 26 of the separator and from the downstream end of the accumulator loop 42 can bypass the gas compressors 34. The bypass connection piping 90, with valve 18 closed, enables liquids to be separated and accumulated even though compressors 34 are not operating.

Appropriate additional check valves (depicted by the standard symbols) are employed in the various lines at selected positions to prevent flow of the gases or liquids through the lines in undesired directions. In addition, appropriate control valves (depicted by the standard symbols) are employed in the lines at desired positions to control the flow of the fluids through the lines and the operation of the system.

In operation, the fluids arrive at the compression station through the incoming pipeline 10. In normal operation, the valve 18 in bypass line 88 is closed and the fluid flows through control valve 12. Any spheres utilized to propel liquid through the incoming pipeline 10 will be removed by the pipeline sphere receiver means 14. Valve 46 is closed and the accumulator loop 42 is full of gas. Prior to the arrival of any liquid from the incoming pipeline 10, a sphere 56 has been injected into the head of the accumulator loop 42 by the sphere launcher/receiver means 62 and is positioned at the reducer 65. Thereafter, the sphere 56 is driven downstream into the accumulator loop 42 either by the hydraulic head of the liquids accumulating behind and above the sphere 56 or by the hydraulic head in combination with a pressure differential created by the throttling control valve 54. The two-phase flow continues through inlet nozzle 22 into the plenum chamber 24 of the separator 20. The rates of flow of the fluid and the intermittency and the quantities of the liquid volumes received will vary according to operating conditions of the pipeline system.

If only gas is being received by the separator 20 from incoming pipeline 10, the gas flows upwardly through the first outlet nozzle 26 and control valve 54, through piping 32 and into the suction side of the gas compressors 34 in the compression station. The gas pumped by the gas compressors 34 is discharged through piping 72 into the main discharge line 74 on the discharge side of the compression station.

As liquid is received from the pipeline 10 and separated from the gas in the plenum chamber 24 of the separator, the liquid flows downwardly through the outlet nozzle 28, through the piping 36 and the check valve 82, into the enlarged chamber 40 of the accumulator loop 42 and against the sphere 56. The separated liquids initially flow downwardly out the second outlet nozzle 28 in the separator due to the forces of gravity. When liquid has been separated and drained into the accumulator loop 42 against the sphere 56 and has backed-up through the interconnecting pipe 36 whereby a gas-liquid interface is formed in the plenum chamber of the separator and reaches preselected level A, the liquid level controller means 30 generates the necessary signals to commence closing control valve 54 and to fully open control valve 46. This impresses a pressure differential between the liquid surface in the separator and the downstream side of the sphere 56 in the accumulator loop in addition to the hydraulic head of the liquid column between the surface of the liquid in the separator and the level of the sphere 56, thereby forcing the accumulating liquids to flow into the accumulator loop. If the level of the liquid in the plenum chamber continues to rise, the controller means 30 trottles the control valve 54 more and thereby increases the differential pressure across the liquid in the separator 20, the piping 36 and the accumulator loop 42, and causes the sphere and the accumulating liquids to move further downstream and at a faster rate through the accumulator loop. As the sphere 56 moves through the accumulator loop and more liquid is accumulated in the loop, the gas in the accumulator loop is discharged from the accumulator loop through piping 44 and open control valve 46, into the suction side of the gas compressors 34.

If the incoming fluid becomes substantially devoid of gas, that is, becomes a continuous slug of liquid, and the level of the liquid in the separator rises to level B in the separator, the controller means 30 will effect complete closure of the control valve 54 thereby forcing all of the liquid received in the separator into the accumulator loop 42 behind the sphere at whatever rate of flow the liquid may be received from the incoming pipeline 10 and with a corresponding discharge of gas volume through open-control valve 46 into piping 32 and thence to the compressors 34. Under these conditions, an incoming stream of liquid can be received by the separator and diverted into the accumulator loop at pipeline flow velocity. Gas is simultaneously discharged from the accumulator loop through piping 44 into the suction side of the gas compressor 34 also at line flow velocity. Thus, the compressor station may contine to operate on that supply of gas previously stored in the accumulator loop even as a continuous slug of liquid is being received by the separator 20.

As the liquid accumulates in the accumulator loop, the position sensors 70 generate signals indicating the position of the sphere and the amount of liquid in the accumulator loop. When the fluid incoming in pipeline 10 is no longer substantially all liquid, but rather is substantially all gas or is mostly gas with just small quantities of liquid therein, the receding level of the liquid in the separator causes the controller means 30 to effect opening of the control valve 54 and the separated gas flows upwardly through the first outlet nozzle 26 into the suction side of the gas compressor 34. The level of the liquid in the plenum chamber 24 will recede to level A or below according to the rate at which liquids are received and separated.

In certain designs of the method and apparatus according to this invention, if the influx of liquids is at a relatively low flow rate, the hydraulic head of the liquids below preselected level A in the separator and in the vertical riser portion of the elongated accumulator loop 42 can be sufficient to drive the sphere 56 along the accumulator at a fast enough rate to accommodate the accumulation of separated liquids behind the moving sphere 56. In that event liquids are accumulated in the elongated accumulator 42 without the liquid level rising to or above preselected level A and without the liquid level controller causing control valve 54 to throttle. Since the liquid level is below preselected level A in the separator, control valve 46 is fully closed. Under these conditions gas is displaced by the moving sphere 56 from the accumulator 42 through equalizing piping 48, through check valve 52 and into the separator, and through fully open control valve 48, through piping 32 and to the compressor 34.

At a point in time when little or no liquid is being received from the incoming pipeline 10 and when no spheres are scheduled to bring liquid slugs to the gas compressor station, the accumulated liquid preferably is removed from the accumulator loop. As described previously, control valves 46 and 52 are closed to prevent discharge gas from flowing to suction when valve 78 is opened. Valves 68 and 85 are closed and valve 81 is opened. Then control valve 73 in the piping 72 is partly or completely closed whereby gas from the discharge side of the gas compressors 34 is supplied into the downstream end of the accumulator loop and against the sphere 56 therein to drive the sphere and the liquid back through the accumulator loop 42. The rate at which the liquid is discharged to the pipeline 74 is determined by the differential pressure created by the partial or full closure of control valve 73. The liquid is driven into the chamber 40 against closed check valve mechanism 64 of the sphere launcher/receiver means 62, past the barred tee connection 66, against closed check valve 82, through control valve 81 and the liquid discharge line 80 into the main discharge line 74 from the compressor station. In this manner, the liquid stored in the accumulator loop 42 is transferred to the discharge side of the gas compressor station without it interfering with or damaging the gas compressors 34. Moreover, in this manner, gas is again inserted into the accumulator loop 42 for future use in driving the gas compressors 34 when the method is repeated.

If, during the operation of removal of the liquid from the accumulator loop 42, additional liquids are received from pipeline 10 in quantities sufficient to cause the level of the liquid in the plenum chamber 24 to reach the level of emergency float switch 58, then the signals generated by switch 58 shut down the compressors or initiate other emergency measures for operation of the gas compressor station.

Preferably, the capacity of the accumulator loop 42 is designed such that it can receive the largest probable accumulation of liquid to be received between periodic transfers of liquid across the gas compressor station. However, if the flow of the liquid in the pipeline system is such that the accumulator loop 42 becomes completely filled, when the position of the sphere is detected by the final position sensor 70*a* near the downstream end of the loop, signals are generated to close control valve 46 and provide for emergency operation of the gas compressor station. The final downstream position sensor 70a is located far enough upstream in the accumulator loop 42 so that the signal generated by the passage of the sphere by it can close quick acting valve 46 in sufficient time that no accumulated liquids will be discharged through piping 44 to the suction piping 32.

Thus, this invention provides an improved method and apparatus for handling fluids in a two-phase flow pipeline system in which the liquids being received at a compression station are separated from the gases and are diverted into an elongated accumulator loop. Gas previously stored in the accumulator loop is supplied to the gas compressors for the continued operation of such compressors. The improved method and apparatus according to this invention solves many disadvantages present in traditional systems and is particularly advantageous when used in offshore environments or when used in connection with pipeline systems in which liquids are being transported through the system by spheres. Many variations in the form of the preferred embodiment will now be apparent to those skilled in the art without departing from the invention. Therefore, the inventon should not be limited to the preferred embodiment, but rather extend to the full scope and spirit of the invention described and claimed in the following claims. What is claimed is:

1. In a two-phase flow pipeline adapted to transport both gas and liquid, a method of handling such flow including the steps of:

supplying the gas and liquid flow stream of the pipeline into a separator and separating the incoming flow stream into gas and liquid;

withdrawing from the upper portion of the separator the gas separated by the separator;

within the parameters of the system, continuously withdrawing from the lower portion of the separator the separated liquid, whereby when the incoming flow contains both liquid and gas the liquid is being withdrawn from the lower portion of the separator at the same time as the gas is being withdrawn from the upper portion of the separator;

supplying the separated liquid into an elongated accumulator means and against a movable piston positioned in such accumulator means, said accumulator means being in fluid communications at its upstream end with the liquid outlet of the separator and in fluid communication at its downstream end with the gas outlet of the separator;

said accumulator means being positioned with respect to said separator whereby the hydraulic head of the separated liquids above the movable piston causes the accumulating liquids to move downstream into the elongated accumulator means; and after a selected quantity of liquid has been accumulated in the accumulator means, supplying gas under pressure into the accumulator means to force the liquid stored therein out of the accumulator means.

2. In a two-phase flow pipeline adapted to transport both gas and liquid, a method of handling such flow including the steps of:

supplying the gas and liquid flow stream of the pipeline into a separator and separating the incoming flow stream into gas and liquid;

withdrawing from the upper portion of the separator through a throttling control valve the gas separated by the separator;

withdrawing from the lower portion of the separator the separated liquids and supplying the separated liquid into an elongated accumulator means and against a movable free piston positioned in such accumulator means, said accumulator means being in fluid communication at its upstream end with the liquid outlet of the separator and in fluid communication at its downstream end with the outlet of the control valve;

said step of withdrawing and supplying the separated liquid into the elongated accumulator means including operating the throttling control valve to produce a selected pressure differential across the level of the liquid in the separator and the downstream side of the free piston to cause the accumulating liquids and the free piston to move downstream into the accumulator means; and after a selected quantity of liquid has been accumulated in the accumulator means, operating valving to supply gas under pressure into the accumulator means to force the liquid stored therein out of the accumulator means.

3. In a two-phase flow pipeline system adapted to transport both gas and liquid, a method of handling such flow including the steps of:

supplying a separator means for separating the liquid and gas supplied thereto;

supplying an elongated accumulator means with a movable free piston positioned therein;

supplying the flow stream into the separator means and separating the liquid and gas;

withdrawing from the upper portion of the separator means through a throttling first control valve the separated gas;

providing a fluid communication path from the lower portion of the separator means to the upstream portion of the elongated accumulator means and providing an equalizing line with check valve therein permitting one-way fluid communication from the downstream portion of the elongated accumulator means to the upper portion of the separator means whereby separated liquid may flow into the elongated accumulator means and against the movable free piston responsive to the hydraulic head of the separated liquids above the free piston;

providing a fluid communication path having a second control valve therein between the downstream end of the elongated accumulator means and the output of the throttling first control valve;

when a quantity of liquid has flowed into the elongated accumulator means at a rate sufficient for a liquid level to persist in the separator above a preselected level, operating the second control valve to provide fluid communication from the downstream portion of the accumulator means to the outlet of the throttling first control valve and operating the throttling first control valve responsive to the level of liquid in the separator to increase the pressure differential across the liquid level in the separator and the movable free piston in the elongated accumulator means whereby the accumulating liquids and the movable free piston are forced to move downstream in the elongated accumulator means;

when a selected quantity of liquid has been accumulated in the elongated accumulator means, supplying gas under pressure into the accumulator to force the liquid stored therein out of the accumulator means.

4. In a two-phase flow pipeline system adapted to transport liquid and gas, a method of handling such flow including the steps of:

supplying a separator means for separating the liquid and gas supplied thereto;

supplying an elongated accumulator means with a movable free piston positioned therein;

supplying the flow stream into the separator means and separating the liquid and gas;

withdrawing from the upper portion of the separator means through a throttling first control valve the separated gas;

providing a fluid communication path from the lower portion of the separator means to the upstream portion of the elongated accumulator means and providing an equalizing line with check valve therein permitting one-way fluid communication from the downstream portion of the elongated accumulator means to the upper portion of the separator means whereby separated liquid may flow into the elongated accumulator means and against the movable free piston repsonsive to the hydraulic head of the separated liquids above the free piston;

providing a fluid communication path having a second control valve therein between the downstream end of the elongated accumulator means and the output of the throttling first control valve;

when a quantity of liquid has flowed into the elongated accumulator means at a rate sufficient for a liquid level to persist in the separator above a preselected level, operating the second control valve to provide fluid communication from the downstream portion of the accumulator means to the outlet of the throttling first control valve and operating the throttling first control valve responsive to the level of liquid in the separator to increase the pressure differential across the liquid level in the separator and the movable free piston in the elongated accumulator means whereby the accumulating liquids and the movable free piston are forced to move downstream in the elongated accumulator means;

when a selected quantity of liquid has been accumulated in the elongated accumulator means, supplying as under pressure into the elongated accumulator means against the downstream side of the movable free piston to force the liquid stored in the elongated accumulator means back upstream through the elongated accumulator means and out of the elongated accumulator means.

5. In a two-phase flow pipeline system adapted to transport liquid and gas, a method of handling such flow including the steps of:

supplying a separator means for separating the liquid and gas supplied thereto;

supplying an elongated accumulator means with a movable free piston positioned therein;

supplying the flow stream into the separator means and separating the liquid and gas;

withdrawing from the upper portion of the separator means through a throttling first control valve the separated gas;

providing a fluid communication path from the lower portion of the separator means to the upstream portion of the elongated accumulator means and providing an equalizing line with check valve therein permitting one-way fluid communication from the downstream portion of the elongated accumulator means to the upper portion of the separator means whereby separated liquid may flow into the elongated accumulator means and against the movable free piston responsive to the hydraulic head of the separated liquids above the free piston;

providing a fluid communication path having a second control valve therein between the downstream end of the elongated accumulator means and the output of the throttling control valve;

when a quantity of liquid has flowed into the elongated accumulator means at a rate sufficient for a liquid level to persist in the separator above a preselected level, operating the second control valve to provide fluid communication from the downstream portion of the accumulator means to the outlet of the throttling first control valve and operating the throttling control valve responsive to the level of liquid in the separator to increase the pressure differential across the liquid level in the separator and the movable free piston in the elongated accumulator means whereby the accumulating liquids and the movable free piston are forced to move downstream in the elongated accumulator means;

after selected liquid has been supplied in the elongated accumulator means inserting a second movable free piston into the elongated accumulator means upstream of the accumulated liquid; and supplying gas under pressure into the elongated accumulator means against the second movable free piston to force the second movable free piston and the accumulated liquids downstream through the elongated accumulator means and to force the accumulated liquids out of the elongated accumulator means.

6. In a two-phase flow pipeline system including a gas compressor station in which system is adapted to transport both gas and liquid, a method of transferring selected quantities of the liquid from the suction side to the discharge side of such gas compressor station, including the steps of:

supplying the incoming gas and liquid flow stream into a separator at the suction side of the gas compressors and separating the incoming flow stream into gas and liquid;

withdrawing from the upper portion of the separator separated gas and supplying such separated gas into the suction side of the gas compressors;

within the parameters of the system, continuously withdrawing from the lower portion of the separator the separated liquids and supplying the separated liquids into an elongated accumulator means for receiving and temporarily storing a variable mass of liquids and against a movable piston positioned inside the accumulator means; whereby when the incoming flow stream contains both liquid and gas, the liquid is withdrawn from the lower portion of the separator and supplied into the elongated accumulator means at the same time as the gas is withdrawn from the upper portion of the separator;

the accumulator means being in fluid communication at its upstream end with the liquid outlet of the separator and in fluid communication at its downstream end with the gas outlet of the separator, and the accumulator loop being positioned with respect to the separator whereby the hydraulic head of the separated liquids above the movable piston causes the accumulating liquids and the movable piston to undergo movement downstream through the accumulator means; and after a selected quantity of liquid has been accumulated in the accumulator means, operating valving means to place the discharge side of the gas compressors in fluid communication with the accumulator means whereby the pressure of the gas output from the gas compressors forces the accumulated liquid out of the accumulator means into the pipeline system on the discharge side of the gas compressor station.

7. In a two-phase flow pipeline system including a gas compressor station and which system is adapted to transport both gas and liquid, a method of transferring selected quantities of the liquid from the suction side to the discharge side of such gas compressor station, including the steps of:

supplying the incoming gas and liquid flow stream into a separator and separating the incoming flow stream into gas and liquid;

withdrawing from the upper portion of the separator through a control valve the separated gas and supplying such gas to the suction side of the gas compressors;

withdrawing from the lower portion of the separator the separated liquids and supplying the separated liquids into an elongated accumulator means and against a movable free piston positioned in such accumulator means;

the accumulator means being in fluid communication at its upstream end with the liquid outlet of the separator and in fluid communication at its downstream end with the outlet of the control valve, and said accumulator loop being filled with gas downstream of the movable piston;

said step of withdrawing and supplying the separated liquid into the elongated accumulator means including operating the control valve to produce a selected pressure differential across the level of the liquid in the separator and the downstream side of the movable piston to cause the accumulating liquids and the movable piston to move downstream through the accumulator means;

as the gas previously stored in the accumulator means is forced from the accumulator means by the downstream movement of the movable piston, supplying such gas to the suction side of the gas compressors; and after a selected quantity of liquid has been accumulated in the accumulator means, supplying pressurized gas from the discharge of the gas compressors into the accumulator means to force the accumulated liquid out of the accumulator means and into the pipeline system on the discharge side of the gas compressor station.

8. In a two-phase flow pipeline system including a gas compressor station and which system is adapted to transport both gas and liquid, a method of transferring selected quantities of the liquid from the suction side to the discharge side of such gas compressor station, including the steps of:

supplying a separator means for separating the liquid and gas supplied thereto;

supplying an elongated accumulator means with a movable free piston positioned therein, said elongated accumulator means being filled with gas downstream of the free piston;

supplying the flow stream into the separator and separating the incoming flow stream into gas and liquid;

withdrawing from the upper portion of the separator through a first control valve the separated gas and supplying such gas into the suction side of the gas compressors;

providing a fluid communication path from the lower portion of the separator to the upstream portion of the elongated accumulator means and providing an equalizing line with check valve therein permitting fluid communication from the downstream portion of the elongated accumulator means to the upper portion of the separator means whereby separated liquid may flow into the elongated accumulator means and against the movable free piston positioned therein;

providing a fluid communication path having a second control valve therein between the downstream end of the elongated accumulator means and the output of the first control valve;

responsive to a quantity of liquid having flowed into the elongated accumulator means at a rate sufficient for liquid to persist in the separator above a preselected level, operating the second control valve to provide fluid communication from the downstream portion of the accumulator means to the outlet of the first control valve and operating the first control valve to increase the pressure differential across the liquid level in the separator and the movable free piston in the elongated accumulator means whereby the accumulating liquids and the movable free piston are forced to move downstream in the elongated accumulator means and the gas previously stored in the elongated accumulator means is forced from the elongated accumulator means;

supplying to the suction side of the gas compressors the gas forced from the elongated accumulator means; and when a selected quantity of liquid has been accumulated in the elongated accumulator means, supplying the discharge from the gas compressors into the elongated accumulator means to force out of the accumulator means the accumulated liquid and to refill the accumulator means with the gas, the accumulated liquid forced from the accumulator means being supplied to the pipeline system downstream to the gas compressor station.

9. In a two-phase flow pipeline system including a gas compressor station and which system is adapted to transport both gas and liquid, a method of transferring selected quantities of the liquid from the suction side to the discharge side of such gas compression station according to claim 8 wherein the step of supplying the discharge from the gas compressors into the accumulator means to force the liquid stored therein out of the accumulator means includes the additional step of:

supplying gas under pressure from the discharge side of the gas compressors into the elongated accumulator means against the downstream side of the movable free piston to force the liquid stored in the elongated accumulator means back upstream through the elongated accumulator means and to force the liquid out of the elongated accumulator means adjacent its upstream end.

10. In a two-phase flow pipeline system including a gas compressor station and which system is adapted to transport both gas and liquid, a method of transferring selected quantities of the liquid from the suction side to the discharge side of such gas compression station according to claim 8 wherein the step of supplying the discharge from the gas compressors into the accumulator means to force the liquid stored therein out of the accumulator means includes the additional steps of:

after selected quantities of liquid have been accumulated in the elongated accumulator means, inserting a second movable free piston into the elongated accumulator means upstream of the accumulated liquid; and supplying gas under pressure from the discharge side of the gas compressors into the elongated accumulator means against the second movable free piston to force the second movable free piston and the accumulated liquids downstream through the elongated accumulator means and to force the accumulated liquids out of the elongated accumulator means into the pipeline system on the discharge side of the gas compressor station.

11. In a two-phase flow pipeline adapted to transport both gas and liquid, an apparatus for handling such flow, including:

a separator means for receiving the incoming gas and liquid flow and separating the gas and the liquid;

a first outlet at the upper portion of the separator through which the separated gas may be withdrawn;

a throttling control valve connected to the first outlet for controlling the flow of the gas from the separator;

a second outlet at the lower portion of the separator from which the separated liquids may be withdrawn;

elongated accumulator means in fluid communication with the second outlet of the separator for receiving and temporarily storing the separated liquids;

a movable free piston means positioned in the elongated accumulator means;

means with a second control valve therein providing fluid communication between the downstream side of the elongated accumulator means and the output of the throttling control valve;

said elongated accumulator means being positioned with respect to the separator such that the hydraulic head of the separated liquids above the movable free piston causes accumulating liquids to undergo some movement downstream into the elongated accumulator means;

means for controlling the operation of the throttling control valve and the second control valve whereby a selected pressure differential may be established across the level of the liquid in the separator and the downstream side of the movable free piston to cause the accumulating liquids and the free piston to move downstream into the accumulator means; and means for supplying gas under pressure into the accumulator means to force the liquid stored therein out of the accumulator means after a selected quantity of liquid has been accumulated in the accumulator means.

12. In a two-phase flow pipeline adapted to transport both gas and liquid, an apparatus according to claim 11 wherein the means for supplying gas under pressure into the elongated accumulator means to force the liquid stored therein out of the elongated accumulator means further includes:

means for supplying gas under pressure into the elongated accumulator means against the downstream side of the movable free piston to force the liquid stored in the elongated accumulator means back upstream through the elongated accumulator means and out of the elongated accumulator means.

13. In a two-phase flow pipeline adapted to transport both gas and liquid, the apparatus according to claim 11 wherein the means for supplying gas under pressure into the elongated accumulator means to force the liquid stored therein out of the elongated accumulator means further includes:

means for inserting a second movable free piston into the elongated accumulator means upstream of the accumulated liquids; and means for supplying gas under pressure into the elongated accumulator means against the second movable free piston to force the second movable free piston and the accumulated liquids downstream through the elongated accumulator means and to force the accumulated liquids out of the elongated accumulator means.

14. In a two-phase flow pipeline system adapted to transport both gas and liquid and which system includes a gas compressor station located on a platform positioned in a body of water, an apparatus for transferring selected quantities of the liquid arriving at the gas compression station from the suction side to the discharge side of the gas compressors in such station, including:

separator means for receiving the incoming gas and liquid flow and separating the gas and the liquid;

a first outlet at the upper portion of the separator through which the separated gas may be withdrawn;

means having a first control valve therein providing a fluid communication path between the first outlet and the suction side of the gas compressors;

a second outlet at the lower portion of the separator from which the separated liquids may be withdrawn;

an elongated accumulator means in fluid communication with second outlet of the separator for receiving and temporarily storing the separated liquids; means for positioning a movable free piston means in the elongated accumulator means adjacent the upstream end thereof;

means for supplying gas into the elongated accumulator means for temporary storage therein;

means having a second control valve therein providing a fluid communication path between the downstream end of the elongated accumulator means and the output of the first control valve;

said elongated accumulator means extending downwardly from the separator means station to the seabed and looping back upwardly from the seabed to its connection with the separator and being positioned with respect to the separator such that the hydraulic head of the separated liquids above a movable free piston positioned in the elongated accumulator means causes accumulated liquids and the movable free piston to undergo movement downstream into the elongated accumulator means;

means for controlling the operation of the first and second control valves responsive to the level of the liquid in the separator whereby a selected pressure differential may be established across the level of the liquid in the separator and the downstream side of the movable free piston to cause the accumulating liquids and the free piston to move downstream into the accumulator means and to force the gas stored temporarily in the elongated accumulator means to flow into the suction side of the gas compressors; and means for supplying gas under pressure into the accumulator means to force the liquid stored therein out of the accumulator means and into the pipeline system on the discharge side of the gas compressors.

* * * * *